United States Patent
Silveira

(10) Patent No.: US 6,603,831 B1
(45) Date of Patent: Aug. 5, 2003

(54) SYNCHRONOUS DIGITAL DATA TRANSMITTER

(75) Inventor: Douglas A. Silveira, Wakefield, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 09/443,700

(22) Filed: Nov. 19, 1999

(51) Int. Cl.[7] .............................................. H04L 25/38
(52) U.S. Cl. ....................................................... 375/372
(58) Field of Search ................................. 375/221, 295, 375/354, 372, 371; 370/505, 506, 512, 395, 518–520, 473

(56) References Cited

U.S. PATENT DOCUMENTS

| | | | | |
|---|---|---|---|---|
| 5,204,882 A | * | 4/1993 | Chao et al. ............ | 370/395.62 |
| 5,473,665 A | * | 12/1995 | Hall et al. .............. | 379/22 |
| 5,778,218 A | * | 7/1998 | Gulick .................... | 710/60 |
| 5,802,122 A | * | 9/1998 | Niegel .................... | 370/506 |
| 6,055,248 A | * | 4/2000 | Kobayashi ............. | 370/517 |
| 6,128,761 A | * | 10/2000 | Benayoun et al. ..... | 714/758 |
| 6,219,730 B1 | * | 4/2001 | Nguyen .................. | 341/50 |
| 6,353,635 B1 | * | 3/2002 | Montague et al. ..... | 348/460 |
| 6,363,073 B2 | * | 3/2002 | Nichols ................... | 370/395.62 |

* cited by examiner

Primary Examiner—Emmanuel Bayard
(74) Attorney, Agent, or Firm—Samuels, Gauthier & Stevens, LLP

(57) ABSTRACT

A data transmitter is having a source of data. The data is transmitted in response to clock pulses provided by a clock pulse generator. A buffer having a fixed data storage capacity is provided for storing the data transmitted by the source of data, such data being stored in response to the clock pulses. A framer is provided for retrieving the stored data in response to a data strobe signal produced by the framer and fed to the buffer. The buffer produces a control signal representative of the level of the buffer. A level signal is fed to the clock pulse generator. A superframe strobe signal samples the level of the buffer and produces a level signal representative of the sampled level of the buffer. A clock pulse generator is provided for producing the clock pulses for the data source and the buffer at a rate selected in accordance with the level of the buffer. The data stored in the buffer is read from the buffer in response to the data strobe signal and such data and the clock pulses are provided at an output of the transmitter. With such an arrangement, the data provided by the data source and the data written into the buffer are controlled by a common clock signal provided by the clock pulse generator. The rate of the clock pulses is produced as a function of the fill/empty state of the buffer, thereby ensuring rate matching between the data source rate and the rate data read from the buffer by the framer. Thus, byte stuffing and byte robbing are no longer required thereby increasing the efficiency of the data transfer by allowing reduced overhead framing structures to be used.

18 Claims, 2 Drawing Sheets

SYNCHRONOUS DIGITAL DATA TRANSMITTER

BACKGROUND OF THE INVENTION

This invention relates generally to modems and more particularly to data transmitters used in such modems.

As is known in the art, modems are used to transmit data between a pair of stations. One method for such data transfer is with an Asynchronous Digital Subscriber Loop ADSL. With ADSL, a central office transmits data to a remote terminal in a downstream signal and the remote terminal transmits data to the central office in an upstream signal; the bandwidth of the upstream signal being greater than the bandwidth of the downstream signal. In each stream, however, the data from a data source is transmitted at a frame rate determined by the quality of the transmission line. Since, however, the input data rate may differ from the ADSL data frame rate, byte stuffing and robbing is performed in order to equalize the data source rate and the modem line rate; that is, byte robbing and stuffing is used to insure that each frame had the same number of data bytes per frame.

An alternative technique used to perform this rate adaptation function is to send asynchronous ATM (Asynchronous Transfer Mode) traffic across an ATM Utopia interface. In such an arrangement, the combination of asynchronous handshaking and idle cell generation and deletion perform the rate matching function instead of byte stuffing and robbing. The ability to perform rate adaptation using byte stuffing and robbing is no longer necessary when sending ATM traffic. This technique, however, does not lend itself to interface with traditional Bit Error Rate tester equipment and requires the ATM transmission convergence layer to be integrated into the physical layer.

More particularly, referring to FIG. 1, the transmitter 10 of a modem at one station and receiver 12 of a modem at a second station of an ADSL system is shown. Here, the transmitter 10 includes a data source 14, a buffer 16, here a First-In/First Out (FIFO), and a framer 18, arranged as shown. The data from the data source 14 is clocked into the FIFO 16 in response to the clock pulses fed thereto from the data source 14. The clock pulse rate varies from 0 to about 10 MBtyes per second (MBps). The framer 18 produces framed data at the ADSL line rate, which as noted above, is a function of the quality of the line connecting the transmitter 10 and the receiver 12. More particularly, a burst of data is "pulled", or retrieved from, the FIFO 16 in response to a strobe signal supplied by the framer 18. Since the data input rate to the FIFO 16 from data source 14 is asynchronous with respect to the frame rate, byte stuffing or robbing is performed by the framer 18 in order to equalize the rates. This function is performed by a "stuff and rob" section using a level signal from the FIFO 16 to determine if the input rate is lower or higher than the outgoing ADSL line, or frame rate. If the level increases, then the input rate exceeds the ADSL internal rate and an additional byte is passed to the next ADSL frame in a predetermined byte position and signalled in a fast byte or sync byte. That is the signalling that a byte has been stuffed or robbed is passed in the fast byte for the fast data and the synch byte for interleaved data.

In the receiver 12, the received data passing through a de-framer 20 which performs a de-stuffing and de-robbing process. Synch control information, from either the fast or the synch byte, depending on whether the data comes from the fast or interleaved path, is used to determine if the last byte should be blocked from or if additional bytes should be added to the FIFO. Based upon the Synch control information, the output of the de-framer 20 is gated into a FIFO 22. The data is clocked out of the FIFO 20 using a smooth clock generated by a clock pulse generator 24 which can be implemented using a digital phase-locked-loop (DPLL). The clock rate of the clock pulse generator 24 is controlled by the level of the FIFO 22 in order to prevent overflowing of the FIFO 22.

Thus, with the system shown in FIG. 1, the transmit path has stuff or rob bytes in the ADSL framing structure to match the ADSL data line rate thereby reducing the data transfer efficiency of the system.

SUMMARY OF THE INVENTION

In accordance with the present invention, a system is provided having a source of data. The data is transmitted in response to clock pulses. A buffer is provided having a data storage capacity for storing the data transmitted by the source of data. The data is stored in response to the clock pulses. A framer is provided for retrieving the stored data in response to a strobe signal produced by the framer and fed to the buffer. The buffer produces a control signal representative of the fill/empty state of the buffer. A clock pulse generator is provided for producing the clock pulses for the data source and the buffer at a rate selected in accordance with the control signal. The data stored in the buffer is read from the buffer in response to the strobe signal and such data read from the buffer is supplied to the framer in response to the strobe signal.

With such an arrangement, the data provided by the data source and the data written to the buffer are controlled by a common clock signal, which has a rate which is a function of the level of the buffer, thereby ensuring rate matching between the data source rate and the rate data is read from the buffer. Thus, byte stuffing and robbing is no longer required thereby increasing the efficiency of the data transfer.

In accordance with one embodiment of the invention, the clock pulse generator includes a digital phase lock loop which locks the frequency of the input data to the rate at which the framer draws data from the FIFO.

In accordance with one embodiment of the invention, a data transmitter is provided. The transmitter includes a source of data. The data is transmitted in response to clock pulses. A buffer having a data storage capacity is provided for storing the data transmitted by the source of data, such data being stored in response to the clock pulses. A framer is provided for retrieving the stored data in response to a data strobe signal produced by the framer and fed to the buffer. The buffer produces a control signal representative of the fill/empty state of the buffer. A fill/empty level signal and superframe strobe signal are fed to the clock pulse generator. The superframe strobe signal samples the fill/empty state of the buffer and produces a control signal representative of the sampled level (i.e., fill/empty state) of the buffer. A clock pulse generator is provided for producing the clock pulses for the data source and the buffer at a rate selected in accordance with the control signal. The data stored in the buffer is read from the buffer in response to the data strobe signal from the framer and such read data from the buffer is supplied to the framer in response to the strobe signal.

BRIEF DESCRIPTION OF THE DRAWING

These and other features of the invention will become more readily apparent from the following detailed description when read together with the accompanying drawings, in which.

DESCRIPTION OF THE PREFERRED EMBODIMENTS

Figure 1:
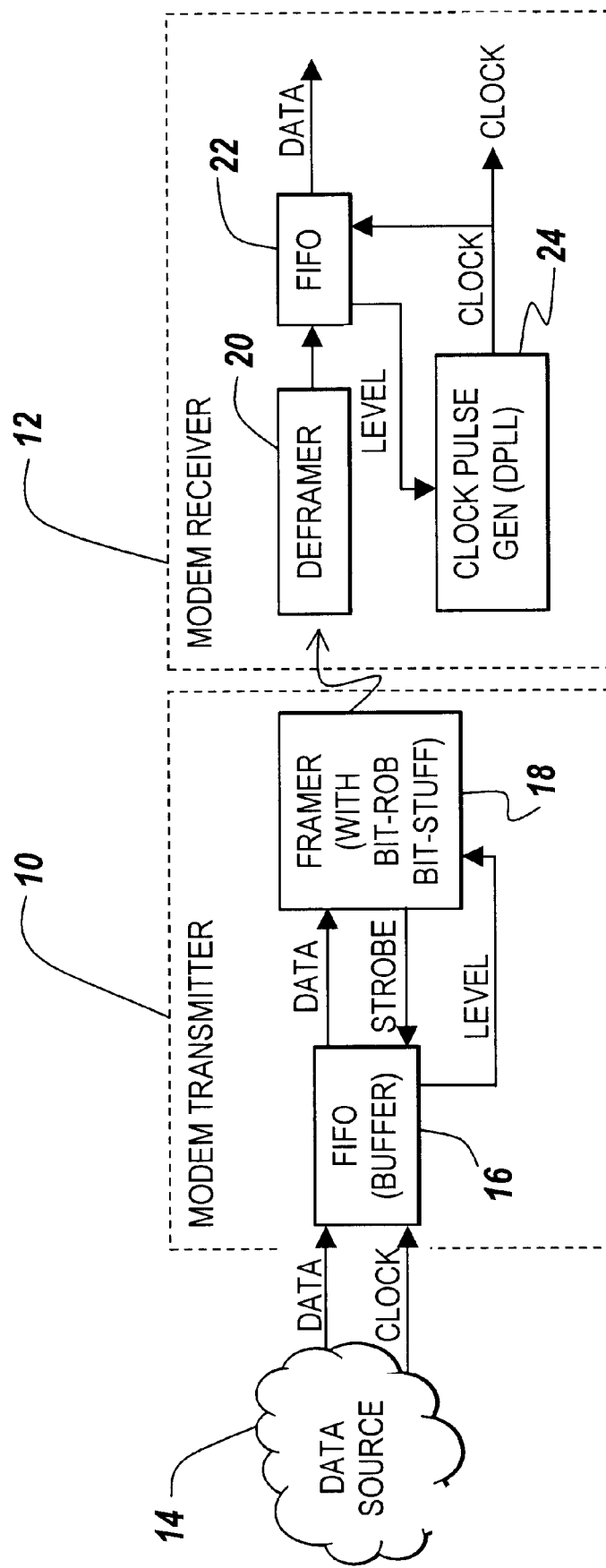
FIG. 1 is a block diagram of a data system according to the prior art.
Figure 2:
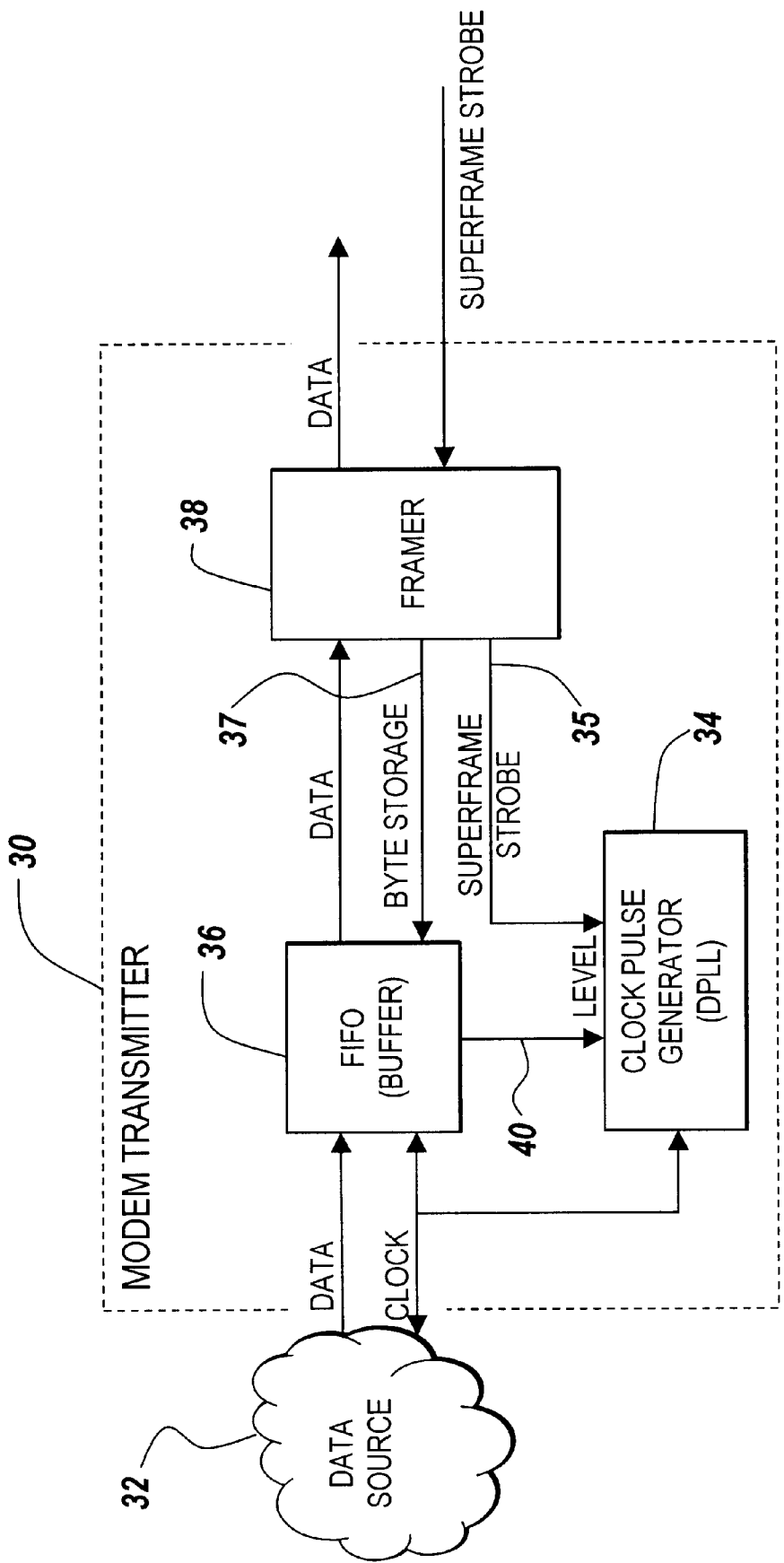
FIG. 2 is block diagram of a transmitter adapted for transmitting data to a receiver in accordance with the invention.

Referring now to FIG. 2, a modem at one station of an ADSL system is shown having a data modem transmitter 30. The modem transmitter 30 is fed by a source of data 32. The data from the source 32 is received by the modem transmitter 30 in response to clock pulses provided by clock pulse generator 34 in the modem transmitter 30. A buffer 36, here a First-In/First Out FIFO register in the modem transmitter 30, receives the data from the source 32 in response to the clock pulses provided by the clock pulse generator 34. The buffer 32 has a fixed data storage capacity.

A framer 38 included in the modem transmitter 30 is provided for retrieving the stored data in the FIFO 36 in response to a data strobe signal produced by the framer 38. A superframe strobe signal produced by the framer 38 at the start of each superframe of data is fed to the clock pulse synchronizer 34 on line 35. A control signal is produced by the buffer 36 on bus 40 representative of the sampled fill/empty state (i.e., level) of the buffer 36. The level on bus 40 from the buffer 36 is sampled in response to the superframe strobe signal on line 35. The clock pulse generator 34, here a digital phase locked loop, produces the clock pulses for the data source 32 and the buffer 36 at a rate selected in accordance with the control signal on bus 40. The phase locked loop locks the input data rate, based upon its own clock, to the ADSL line rate. That is, the phase locked loop locks the frequency of the input data from data source 32 to the rate at which the framer 38 draws data from the FIFO 36.

The data stored in the buffer 36 is read from the buffer 36 in response to the byte strobe signal on line 37 and such data read from the buffer 36 is supplied to the framer 38 in response to the strobe signal on line 37.

With such an arrangement, the data provided by the data source 32 and the data read from the buffer 36 are controlled by a common clock signal provided by the clock pulse generator 34. The rate of the clock pulses produced by the clock pulse generator 34 is produced as a function of the level of the buffer, thereby ensuring rate matching between the data source 32 rate and the rate data is read from the buffer 36 by the framer 38. That is, if the level indicates that the buffer 36 is filling too fast, the clock rate is reduced; and, on the other hand, if the level indicates that the buffer 36 is filling too slowly, the clock rate is increased. Thus, byte stuffing and byte robbing are no longer required thereby allowing a reduced overhead framing mode to be used and increasing the efficiency of the data transfer.

Other embodiments are within the spirit and scope of the appended claims.

What is claimed is:

1. A system, comprising:
    a source of data, such data being transmitted in response to clock pulses;
    a buffer having a fixed data storage capacity for storing the data transmitted by the source of data, such data being stored in response to the clock pulses;
    a framer for retrieving the stored data in response to a strobe signal produced by the framer and fed to the buffer; and
    wherein such buffer produces a control signal representative of the level of the buffer;
    a clock pulse generator for producing the clock pulses for the data source and the buffer at a rate selected in accordance with the control signal;
    wherein data stored in the buffer is read from the buffer in response to the strobe signal; and
    wherein such data is provided at an output of the system.

2. The system recited in claim 1 wherein the clock pulse generator comprises a digital phase locked loop.

3. The system recited in claim 2 wherein the buffer comprises a FIFO.

4. The system recited in claim 1 wherein the buffer comprises a FIFO.

5. A data transmitter, comprising:
    a clock pulse generator;
    a source of data, such data being transmitted in response to clock pulses produced by the clock pulse generator at an input data rate;
    a buffer having a fixed data storage capacity for storing the data transmitted by the source of data, such data being stored in response to the clock pulses;
    a framer for retrieving the stored data in response to a data strobe signal produced by the framer and fed to the buffer; and
    a superframe strobe signal source is fed to the clock pulse generator, such signal being produced for each of a plurality of superframes of data produced by the transmitter and wherein the superframe strobe signal samples the level of the buffer and produces a control level signal representative of the sampled level of the buffer;
    a clock pulse generator for producing the clock pulses for the data source and the buffer at a rate selected in accordance with the control signal;
    wherein data stored in the buffer is read from the buffer in response to the data strobe signal; and
    wherein such data is provided at an output of the transmitter.

6. The data transmitter recited in claim 5 the clock pulse generator includes a digital phase locked loop for locking the input data rate provided by the data source to a rate the framer retrieves data from the buffer.

7. The data transmitter recited in claim 6 wherein the buffer comprises a FIFO.

8. The system recited in claim 1 wherein the source of data is transmitted in response to the clock pulses at an input data rate and where such system includes a digital phase locked loop for locking the input data rate to a rate the framer retrieves data from the buffer.

9. The system recited in claim 8 wherein the buffer comprises a FIFO.

10. A method of synchronous signal digital data transmission, said method comprising:
    transmitting a source of data in response to clock pulses;
    providing a buffer having a fixed data storage capacity for storing the data transmitted by the source of data, such data being stored in response to the clock pulses;
    retrieving the stored data in response to a strobe signal produced and fed to the buffer;
    producing a control signal representative of the level of the buffer;
    producing the clock pulses for the data source and the buffer at a rate selected in accordance with the control signal;

reading data stored from the buffer in response to the strobe signal; and providing such data at an output.

11. The method recited in claim 10, wherein producing the clock pulses includes using a digital phase locked loop.

12. The method recited in claim 11, wherein the buffer comprises a FIFO.

13. The method recited in claim 10, wherein the buffer comprises a FIFO.

14. A method of synchronous signal digital data transmission, said method comprising:

transmitting a source of data in response to clock pulses;

providing a buffer having a fixed data storage capacity for storing the data transmitted by the source of data, such data being stored in response to the clock pulses;

retrieving the stored data in response to a strobe signal produced and fed to the buffer;

providing a superframe strobe signal source, such signal being produced for each of a plurality of superframes of data produced for each of a plurality of superframes of data produced by a transmitter and wherein the superframe strobe signal samples the level of the buffer and produces a control level signal representative of the sampled level of the buffer;

producing the clock pulses for the data source and the buffer at a rate selected in accordance with the control signal;

reading data stored from the buffer in-response to the strobe signal; and providing such data at an output.

15. The method recited in claim 14, wherein producing the clock pulses includes locking the input data rate provided by the data sources to a rate in retrieving the stored data in response to a strobe signal produced from the data buffer.

16. The method of claim 15, wherein the buffer comprises a FIFO.

17. The method of claim 14, wherein the source of data is transmitted in response to the clock pulses at an input rate and where such system includes a digital phase locked loop for locking the input data rate to a rate in retrieving the stored data in response to a strobe signal produced from the data buffer.

18. The method of claim 17, wherein the buffer comprises a FIFO.

* * * * *